Patented Mar. 6, 1934

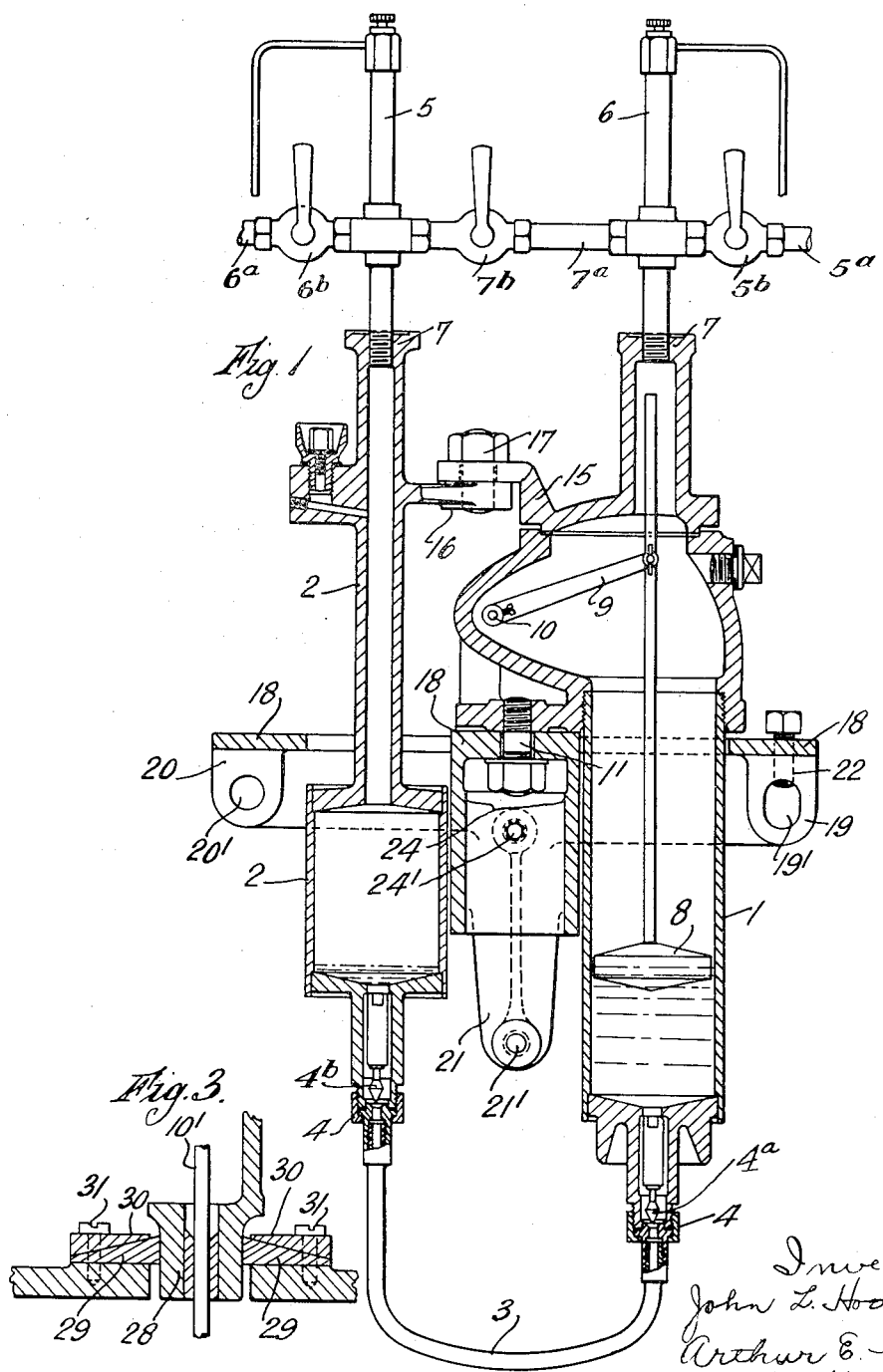

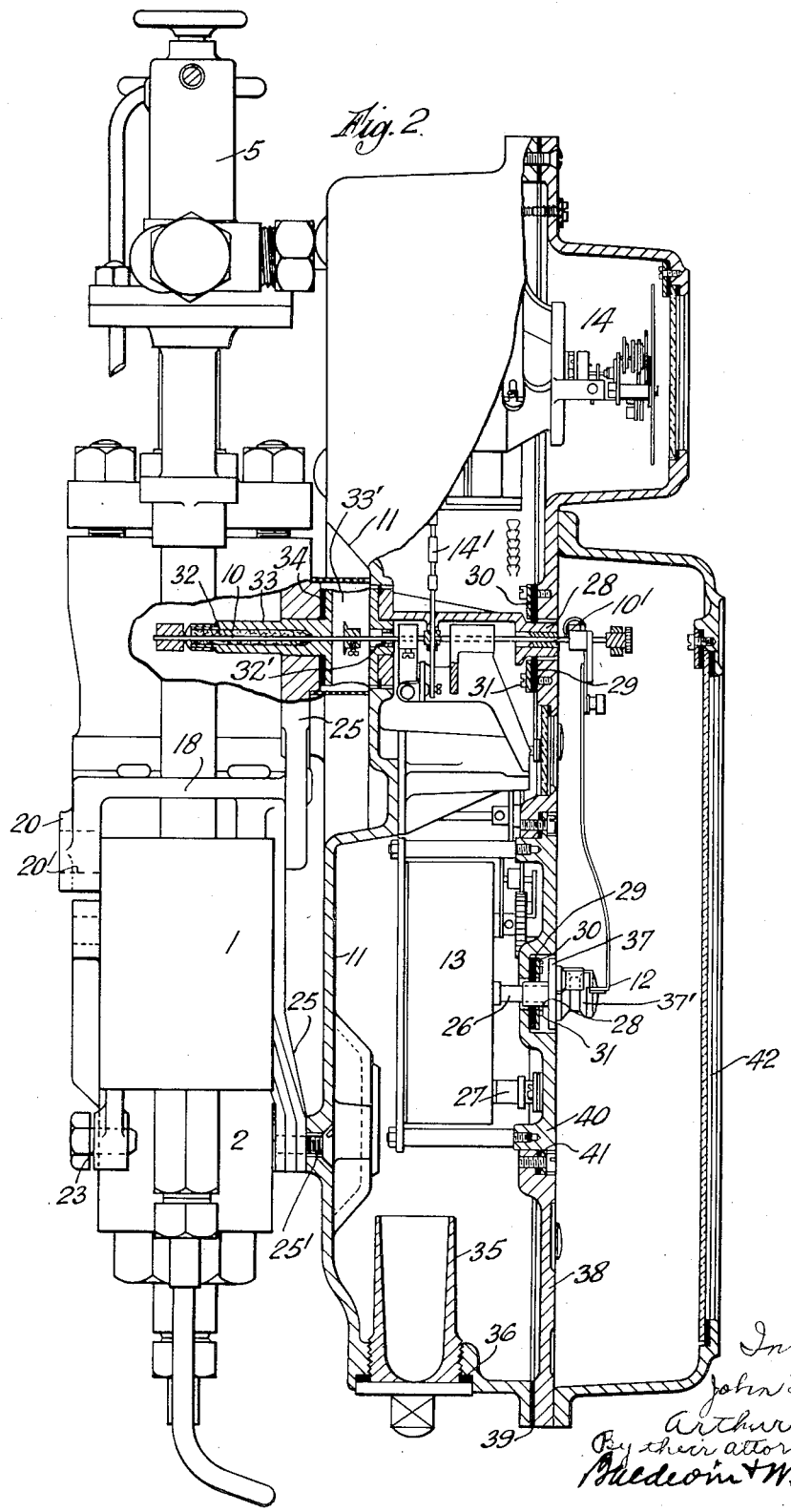

1,950,241

UNITED STATES PATENT OFFICE 1,950,241

METER FOR MEASURING FLUIDS

John Lawrence Hodgson and Arthur Edward Hutson, Luton, England, assignors to George Kent Limited, London, England Application November 5, 1931, Serial No. 573,285

3 Claims. (Cl. 73—167)

This invention relates to meters for measuring fluids and particularly to meters of the kind which are actuated by means of a differential pressure created by a Venturi tube, orifice or the like and applied to the two limbs of a U tube. The upper end of each leg of the U tube is formed by a cylindrical chamber containing mercury one of the chambers containing a float the movement of which is transmitted through a spindle passing through the casing of the apparatus to the pointer or pen of the meter. In meters of this kind the movement of the pointer for a given difference of pressure on the mercury in the chambers is dependent upon the diameter of one chamber relatively to that of the other chamber. In such meters if the chambers of a meter are of a suitable diameter for measuring small differences in pressure they are unsuitable for measuring large differences in pressure.

It is necessary that the mercury in the float chamber, when there is no difference in pressure on the mercury in the chambers, should be at a given height in order that the pointer should indicate zero; if there is too much, or too little mercury the readings of the meter will be inaccurate. In practice, users of meters of this kind have not infrequently found difficulty in correcting the level of the mercury in cases in which the level is found to be incorrect when the meter is delivered to them.

According to one feature of this invention, in order to provide a meter suitable for measuring different maximum variations in pressure, for example, 60, 120 or 180 inches, one of the chambers (preferably that in which the float is not located) is made readily detachable, so that if it is of unsuitable diameter it can readily and quickly be replaced by one of suitable diameter.

In order to overcome the difficulty in correcting the level of the mercury, there are provided, according to a further feature of the invention means by which the meter as a whole can be tilted whereby the pointer can be accurately set at zero when there is no difference of pressure on the mercury in the chambers.

The invention is illustrated in the accompanying drawings in which Figure 1 is a vertical sectional elevation of the U tube portion of the apparatus and Figure 2 a sectional elevation at right angles to Figure 1 showing the meter and the U tube portion of the apparatus, Figure 2 being drawn to a larger scale than Figure 1. Figure 3 is a detail view of a modification.

1, 2 are the two limbs or chamber members of a U tube which are placed in communication with one another by a pipe 3 having union connections 4 and are placed in communication with the upstream and downstream side of a venturi or the like by pipes 5, 6, having air relief valves and pipes at their upper ends, and at their lower ends having connections 7, so that the level of mercury and hence of a float 8 in the limb 1 is dependent upon the differential pressure. Float valves 4ª—4ᵇ located in the bottoms of the chambers 1 and 2 respectively are adapted automatically to close if the pipe 3 is disconnected so as to prevent the loss of mercury from the chambers. The float is connected to an arm 9 on a spindle 10 which passes through the wall of the limb and the wall of a casing 11 housing the indicating mechanism. The indicating mechanism comprises a pen 12 moving over a chart rotated at a constant rate by a clock 13, and a counter 14 which may comprise the well known wheel and disc, the angular position of the wheel being controlled by the spindle 10 through a link mechanism indicated generally at 14' and the angular position of the pen 12 being controlled by the spindle 10 through a spindle 10'.

The limb 2 is supported from the limb 1 by a bracket 15 on the limb 1 and a lug 16 on the limb 2, the lug being bolted to the bracket by a bolt 17. If it is desired to replace an existing limb 2 by one having the desired diameter the connections 4, 7 at each end of the existing limb would be disconnected and the bolt 17 withdrawn to enable the existing limb to be removed, a replacement limb having the same dimensions between the connections at its ends as that of the replaced limb and a lug similar to that on the replaced limb would then be placed in position and secured by the bolt 17 and the connections made. Replacement can thus very easily and quickly be effected. It will be understood that as many limbs having different diameters as desired can be provided all the limbs having the same dimension between its union connections and the similar lugs.

In order to correct the level of mercury by tilting the apparatus as a whole, the limb 1 and hence its attached limb 2 is secured by a bolt 1' to a bracket 18 having lugs 19, 20, 21 provided with apertures 19', 20', 21'. The apertures 19' and 20' receive bolts for securing the bracket to a wall or other support and the aperture 19' is elongated and a bolt 22 is provided to bear against the bolt passing through the aperture 19' so that by rotating the bolt 22 the bracket can be rocked in a vertical plane about the bolt passing through the aperture 20'.

The aperture 21' is screw threaded to receive a bolt 23 which bears against the wall or other support and by means of which the bracket and hence the limbs 1, 2 can be adjusted together about the bolts passing through the apertures 19', 20' perpendicularly to the plane of the drawings (Figure 1).

The bracket is also provided with a socket portion 24 which enables the apparatus to be supported by a post which may be carried by a clip secured around the pipe line through which flows the fluid whose flow is to be indicated or recorded, a screw threaded aperture 24' being provided to receive a clamping screw.

The single bracket thus provides an arrangement permitting the apparatus to be carried either by a wall or like support or alternatively by a post.

The bracket 18 is provided with three additional lugs (of which only two indicated at 25 are shown) each having a screw threaded aperture to receive screws 25' for securing the casing 11 of the meter mechanism to the bracket 18 at three points.

Pipe connections $5^a$ and $6^a$ are adapted to afford communication between the legs 1 and 2 of the U tube and different sources of pressure, while a pipe $7^a$ is adapted to afford communication between the legs of the U tube. Valves $5^b$ and $6^b$ interposed respectively in the pipes $5^a$ and $6^a$ are adapted to cut off communication between the legs of the U tube and the sources of pressure, and a valve $7^b$ interposed in the pipe $7^a$ is adapted to open or close communication between the legs of the U tube. When it is desired to correct the level of mercury in the U tube chambers, the valves $5^b$ and $6^b$ will be closed and the valve $7^b$ opened to equalize the pressure in the U tube chambers. With the pressure equalized in this manner, the liquid level can be corrected accurately by tilting the U tube by means of the bolt 22 or the bolt 23.

In order to render the casing 11 gas tight, the parts, such as the clock 13, the clock driving spindle or shaft 26 for driving the chart, the clock winding spindle 27, and the spindle 10' carrying the pen are provided with gas tight joints which comprise bushes 28 through which the parts extend, a packing washer 29 of leather, felt, or moulded rubber compound or other suitable material, and a plate 30 which is screwed down by screws 31 so as to compress the packing 29 and cause it to expand into gas tight contact with the bush 28. The washer and plate may be flat as shown in Figure 2 or may be provided with inclined meeting surfaces as shown in Figure 3.

Such joints or glands are simple and cheap to manufacture and are suitable for low pressures in either direction.

A gas tight joint for the spindle 10 may consist of a packing gland 32 housed by a bush member 33 itself made gas tight either by a simple parallel washer 34 or preferably by a tapered washer such as that shown in Figure 3. The bush member 33 also carries a bush or gland 32' aligned with but spaced from the gland 32, there being provided a space 33' between the glands 32 and 32' open to the atmosphere. The gas tight joint for a calcium chloride cup 35 is satisfactorily provided by an ordinary packing washer 36. The cup 35 serves to hold a quantity of moisture-absorbing substance such as calcium chloride, the latter absorbing any moisture resulting from condensation within the gas tight casing and preventing the accumulation of moisture on the mechanism contained in the casing. A cap 37' fits over the outer end of the spindle 26 and serves to clamp a circular chart (not shown) against the flange 37, the latter and the cap 37' thus constituting a chart carrier.

Provision is made for the easy detachability of the essential parts of the meter, this being effected by providing a detachable cover plate 38 which encloses the clockwork mechanism and the counter mechanism. This cover plate forms the front of the casing and a gas tight packing in the form of an ordinary packing washer 39 is employed. The clockwork mechanism 13 is carried by a second plate 40 which is detachably mounted in the front cover plate 38 an ordinary packing washer 41 also being interposed between the plate 40 and the front cover plate 38.

A cover plate may also be provided for affording access to the link mechanism 14' for controlling the counter 14 without removing the plate 38.

The chart and pen are enclosed by a glazed cover plate 42 which is hinged to the front cover plate so as to provide for access to the chart.

What we claim is:—

1. In combination, a U tube structure, a gas tight casing connected to said U tube structure, indicating mechanism in said casing, a float in one leg of said U tube, a packed gland in said leg of the U tube, a separate gland in said gas tight casing aligned with but spaced from said first named gland, there being provided a space open to the atmosphere between said glands, and operating means extending through said glands and being operatively connected to said float and said indicating mechanism respectively, said space being exterior of said U tube leg and said casing and being open to said glands at the points at which said operating means passes through said glands.

2. In combination, a U tube structure, a gas tight casing connected to said U tube structure, indicating mechanism in said casing, a float in one leg of said U tube, a packed gland in said leg of the U tube, a separate gland in said gas tight casing aligned with but spaced from said first named gland, there being provided a space open to the atmosphere between said glands, a spindle extending through said glands and into said leg of the U tube structure and said gas tight casing, said space being exterior of said U tube leg and said casing and being open to said glands at the points at which said spindle passes through said glands, and means operatively connecting said spindle with said float and said indicating mechanism.

3. In a U tube structure, the combination of supporting means, a first U tube chamber member secured to said supporting means, a second U tube chamber member, an apertured lug in fixed relation to said first chamber member, an apertured lug in fixed relation to said second chamber member, said lugs being adapted to be secured together with their apertures in alignment to position said chamber members in cooperative relation, a bolt passing through the apertures in said lugs for securing the latter together, and fluid conduit means interposed between and detachably connected to said chamber members.

JOHN LAWRENCE HODGSON.
ARTHUR EDWARD HUTSON.